(12) United States Patent
Hoshi et al.

(10) Patent No.: US 10,189,130 B2
(45) Date of Patent: Jan. 29, 2019

(54) MACHINE TOOL

(71) Applicant: DMG MORI CO., LTD., Nara (JP)

(72) Inventors: Takashi Hoshi, Nara (JP); Ryosuke Yasumura, Nara (JP); Kousuke Yamamoto, Nara (JP); Yukikazu Sakaida, Nara (JP); Akifumi Yoshida, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 267 days.

(21) Appl. No.: 15/255,301

(22) Filed: Sep. 2, 2016

(65) Prior Publication Data
US 2017/0066094 A1 Mar. 9, 2017

(30) Foreign Application Priority Data
Sep. 7, 2015 (JP) .................................. 2015-175826

(51) Int. Cl.
| | |
|---|---|
| *B23Q 3/157* | (2006.01) |
| *B23B 41/02* | (2006.01) |
| *B23Q 11/08* | (2006.01) |
| *B23Q 3/155* | (2006.01) |

(52) U.S. Cl.
CPC .......... *B23Q 3/15713* (2013.01); *B23B 41/02* (2013.01); *B23Q 3/15539* (2016.11); *B23Q 3/15706* (2013.01); *B23Q 3/15766* (2013.01); *B23Q 11/08* (2013.01); *B23Q 3/15506* (2013.01); *B23Q 2003/155418* (2016.11); *B23Q 2003/155428* (2016.11); *B23Q 2003/155439* (2016.11); *Y10T 483/115* (2015.01); *Y10T 483/1767* (2015.01); *Y10T 483/1795* (2015.01)

(58) Field of Classification Search
CPC .......... Y10T 483/1795; Y10T 483/179; Y10T 483/1793; Y10T 483/1798; Y10T 483/1767; B23Q 3/15706; B23Q 3/15506; B23Q 2003/155428; B23Q 2003/155439
See application file for complete search history.

(56) References Cited

U.S. PATENT DOCUMENTS

| | | | | |
|---|---|---|---|---|
| 431,107 | A | * 7/1890 | Cowley | ................ B23B 39/167 173/214 |
| 3,298,098 | A | * 1/1967 | Gleisner, Jr. | ....... B23Q 3/15706 483/47 |
| 4,557,035 | A | * 12/1985 | Rutschle | ............... B23B 31/263 29/264 |
| 5,624,365 | A | * 4/1997 | Haninger | ............. B23Q 3/1554 483/38 |

(Continued)

FOREIGN PATENT DOCUMENTS

| | | |
|---|---|---|
| JP | 08-1468 A | 1/1996 |
| JP | 3165158 U | 1/2011 |

*Primary Examiner* — Daniel Howell
*Assistant Examiner* — Yasir Diab
(74) *Attorney, Agent, or Firm* — IP Business Solutions, LLC

(57) ABSTRACT

A tool holding part holds two boring bars in a manner in which axes of the boring bars are parallel to a spindle axis. A tool change mechanism has a circular arc movement mechanism in which the boring bar moves from a tool holding position to a tool change position by at least a circular arc movement on a plane surface including an axis of the spindle in the tool change position and an axis of the boring bar positioned in the tool holding part.

3 Claims, 16 Drawing Sheets

(56) References Cited

U.S. PATENT DOCUMENTS

| | | | | |
|---|---|---|---|---|
| 5,908,374 A | * | 6/1999 | Kato | B23Q 3/1552 483/1 |
| 2003/0134731 A1 | * | 7/2003 | Komine | B23Q 1/623 483/27 |
| 2005/0143236 A1 | * | 6/2005 | Nakazawa | B23Q 1/66 483/14 |
| 2007/0184954 A1 | * | 8/2007 | Muser | B23Q 3/15526 483/1 |
| 2008/0070768 A1 | * | 3/2008 | Muser | B23Q 3/15526 483/59 |
| 2010/0173762 A1 | * | 7/2010 | Tullmann | B23Q 3/1554 483/44 |

* cited by examiner

MACHINE TOOL

CROSS-REFERENCE TO RELATED APPLICATIONS

The present application claims priority under 35 U.S.C. 119 to Japanese Patent Application No. 2015-175826, filed on Sep. 7, 2015, the contents of which is incorporated herein by reference in its entirety.

BACKGROUND OF THE INVENTION

Field of the Invention

The present invention relates to a machine tool provided with a tool changer, which changes a tool held by a tool holding part and a tool clamped by a spindle, and specifically, relates to a tool changer which is suitable for changing a long tool.

Description of the Related Art

For example, as a conventional tool changer which is suitable for the tool change of a long tool such as a boring bar, etc., a plurality of boring bars is stored, and it is provided with a boring bar magazine which enables indexing each of the boring bars to a predetermined height in a tool change position by linear movement as described in Japanese Utility Model Patent No. 3165158.

Further, there is a tool changer in which a sleeve is axially movably arranged in a spindle tube. In the tool changer, a tool is supported through a parallel link mechanism by the sleeve, and a cylinder mechanism is provided to drive the parallel link mechanism. Also, in the tool changer, a cylinder mechanism is provided to axially drive the sleeve, and a driving mechanism is provided to rotate the sleeve around a shaft as described in Japanese Unexamined Patent Application Publication No. H08-1468.

In the boring bar magazine in the conventional device described in Japanese Utility Model Patent No. 3165158, the long boring bar is stored in the manner in which the axis of the long boring bar intersects with the axis of the spindle, so that the machine extends in a width direction when viewed from the machine front. Therefore, there is a problem because the whole machine becomes large in size in the width direction.

In the conventional device described in Japanese Unexamined Patent Application Publication No. H08-1468, a tool is attached to and detached from the spindle by complicated operations. Therefore, there is a problem because the structure becomes complicated.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

An object of the present invention is to provide a machine tool which is provided with a tool changer without enlarging the whole machine tool, and the tool changer can change tools with a simple structure even if the tools are long tools.

In some embodiments of the present disclosure, a machine tool having a tool changer includes a tool holding part holding a plurality of tools; and a tool change mechanism changing a tool held by the tool holding part and a tool clamped by a spindle. The tool holding part holds the plurality of tools in a manner in which axes of the tools are parallel to an axis of the spindle. The tool change mechanism includes a circular arc movement mechanism, and the circular arc movement mechanism moves the tools from a tool holding position to a tool change position, where the tool is coaxial with the axis of the spindle, by at least a circular arc movement on a plane surface including the axis of the spindle positioned in the tool change position, which is different for each of the tools, and an axis of the tool positioned in the tool holding part.

In some embodiments of the present disclosure, in the machine tool as recited above, the tool holding part is positioned on a side of the spindle.

In some embodiments of the present disclosure, in the machine tool as recited above, the tool change mechanism includes a linear movement mechanism which linearly moves the tool in the direction of the axis of the tool at least before the circular arc movement.

In some embodiments of the present disclosure, in the machine tool as recited above, the tool is a boring bar which performs long boring process.

According to some embodiments as recited above, the plurality of tools is held in a manner in which the axes of the tools are parallel to the axis of the spindle, so that even though it is a long tool, the width dimension of the whole machine can be miniaturized when viewed from the spindle axis direction in comparison with the case of holding the tools intersecting with the spindle axis.

Further, the tool moves from the tool holding position to the tool change position, where the tool is coaxial with the spindle axis, by the circular arc movement on the plane surface including the axis of the spindle and the axis of the tool, and therefore, the structure can be simplified in comparison with the case of driving the sleeve in the axis direction and driving it rotationally.

According to some embodiments as recited above, the tool holding part is arranged on the side of the spindle, and therefore, from this point, the width dimension of the whole machine can be miniaturized when viewed from the spindle axis direction.

According to some embodiments as recited above, in addition to the circular arc movement mechanism, the linear movement mechanism which linearly moves the tool in the axis direction is provided. Therefore, even though the tool is a long tool such as a boring bar, it can be arranged on the machine depth side in a manner in which a part of the tool is overlapped with the tool clamping part of the spindle when viewed from the width direction. Therefore, a space where other mechanisms are arranged can be secured on the front side of the machine, and the whole machine can be miniaturized in the spindle axis direction.

That is, regarding the tool change, prior to the circular arc movement, the tool linearly moves by the linear movement mechanism in order to solve the overlapping, and after that, the tool moves by the circular arc movement in the circular arc movement mechanism. Therefore, the tool change can be performed without any problem even when the part of the tool is overlapped with the tool clamping part of the spindle.

Further, in a case in which the linear movement mechanism linearly moves the tool after the circular arc movement, when the tool is clamped in the tool clamping part of the spindle, the interference between the tapered shank part of the tool and the tapered hole part of the spindle can be avoided, and therefore, the tool change can be more easily and securely performed.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

DETAILED DESCRIPTION

Figure 1:
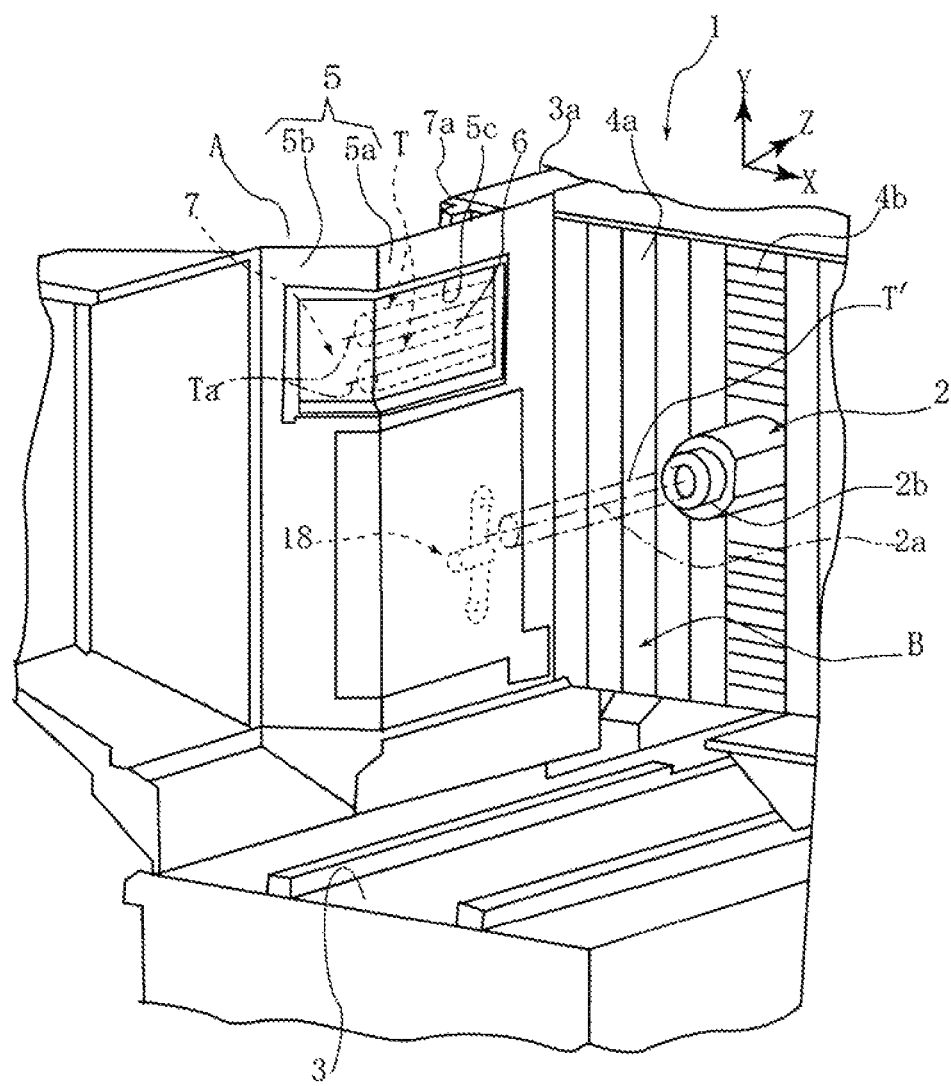
FIG. 1 is a front perspective view of a machine tool provided with a tool changer according to embodiment 1 of the present invention when viewed from a front side.
Figure 2:
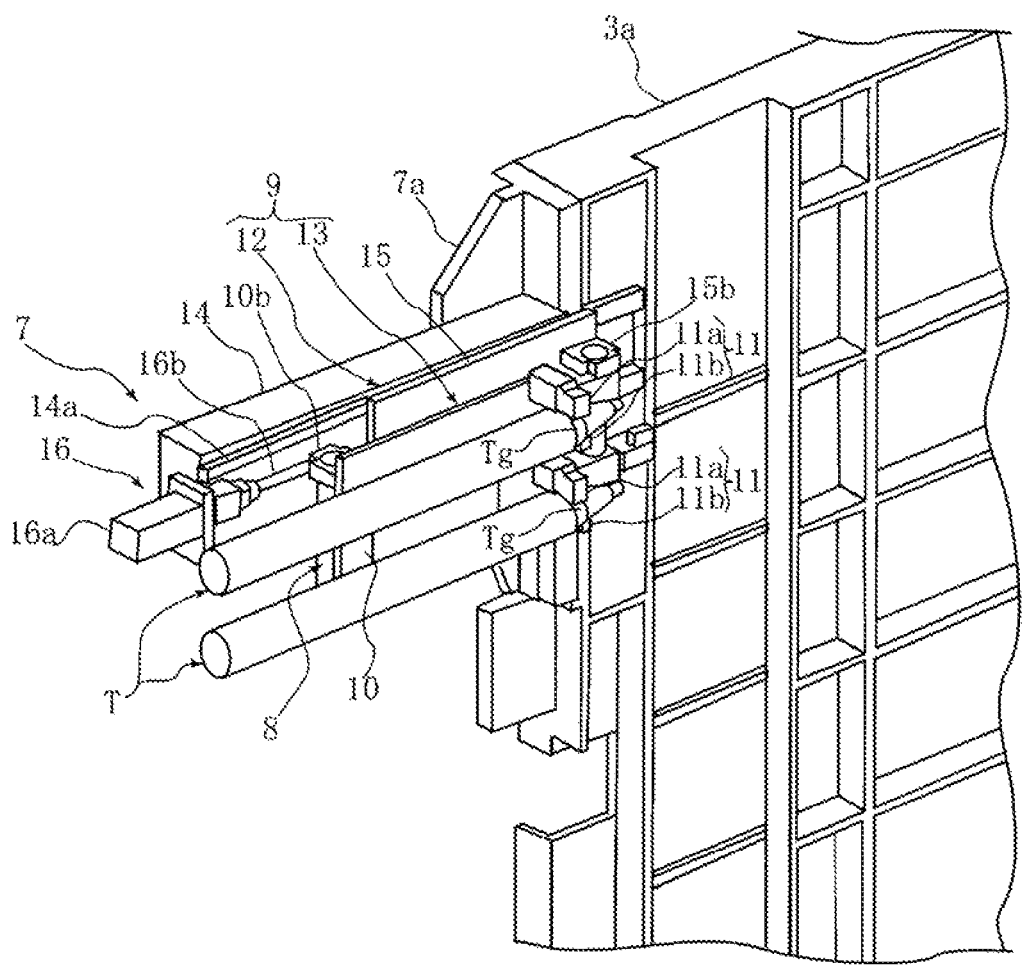
FIG. 2 is a front perspective view of the tool changer when viewed from a machine front side.
Figure 3:
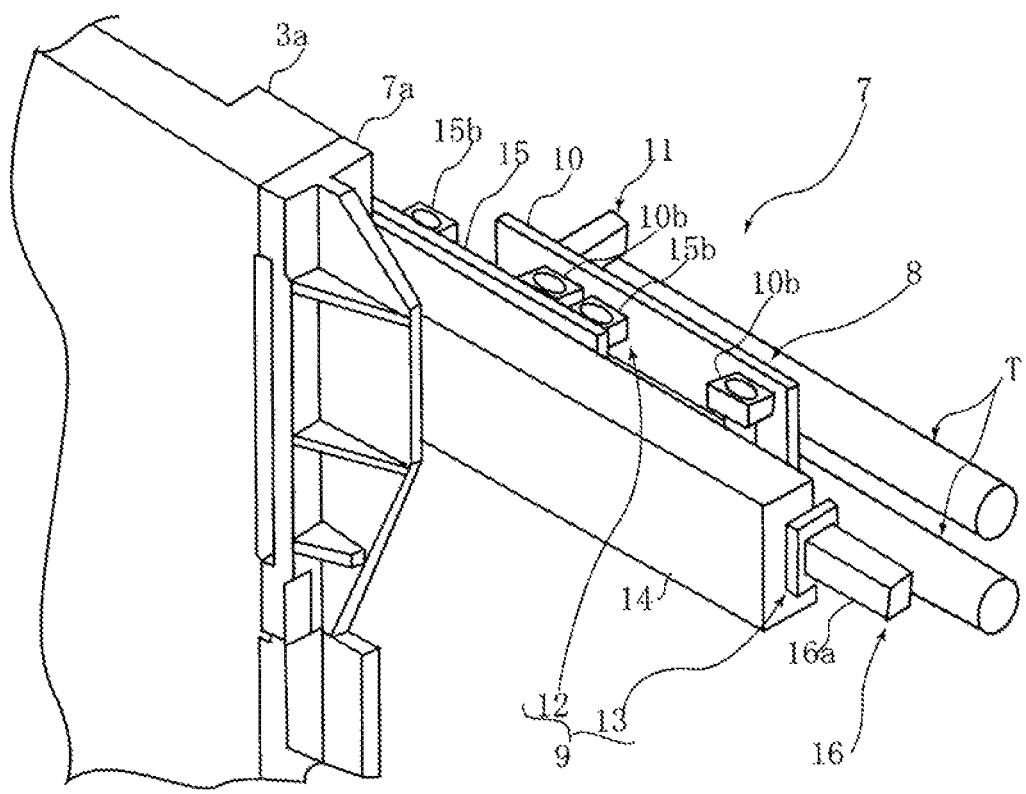
FIG. 3 is a side perspective view of the tool changer when viewed from a side of the machine.
Figure 4:
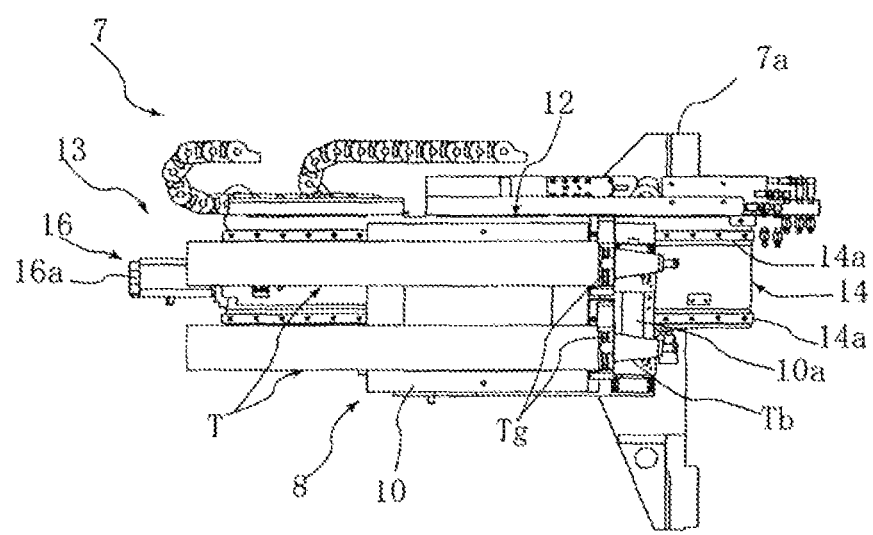
FIG. 4 is a side view of the tool changer when viewed from a direction intersecting a spindle axis.
Figure 5:
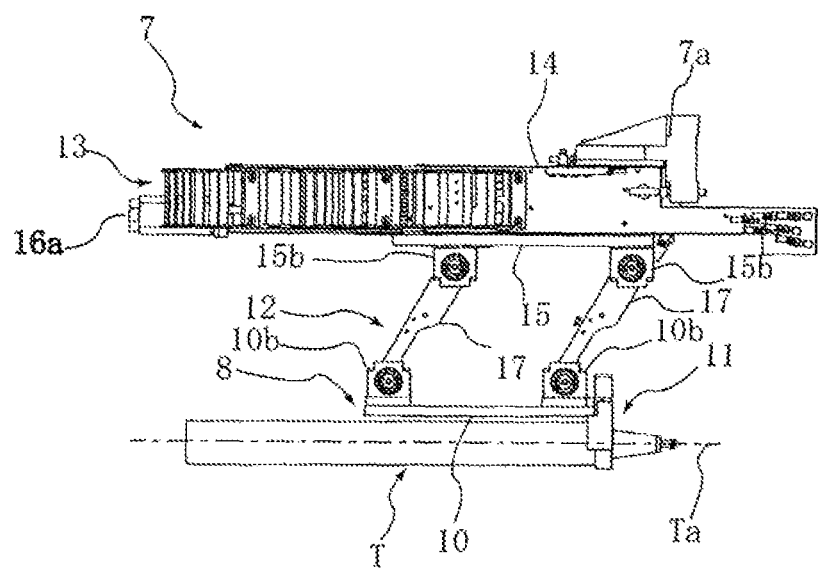
FIG. 5 is a plane view of a tool changer.
Figure 6:
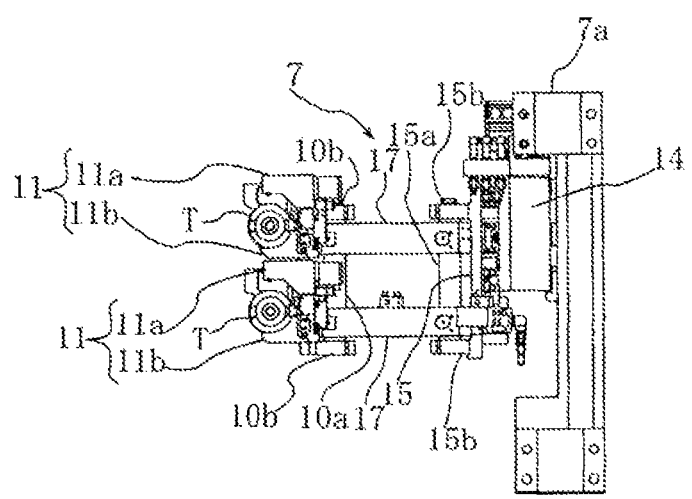
FIG. 6 is a rear view of the tool changer when viewed from a depth side of the machine to the spindle axis direction.
Figure 7:
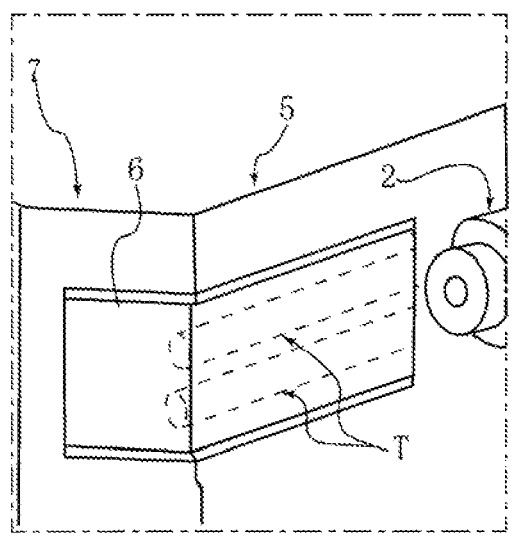
FIG. 7 is a front perspective view showing a preparation step in a tool change process.

In the following paragraphs, some embodiments of the invention will be described by way of example and not limitation. It should be understood based on this disclosure that various other modifications can be made by those in the art based on these illustrated embodiments.

Hereinafter, embodiments of the present invention will be described in reference to the drawings.

Embodiment 1

FIGS. 1 to 16 are the drawings to describe a machine tool provided with a tool changer according to embodiment 1 of the present invention. In the present embodiment, unless otherwise specified, the indications "front", "rear", "left" and "right" mean the front side, depth side, left side and right side of the machine when viewed from the machine front face.

In the drawings, the reference numeral 1 denotes a machine tool in which, for example, a cylinder bore performs a boring processing to a cylinder block. In the machine tool 1, a spindle 2 is arranged on a bed 3 so as to be movable in a lateral direction (X-axis direction) and a vertical direction (Y-axis direction) in a manner in which an axis 2a of the spindle 2 directs horizontally. The reference numerals 4a and 4b denote a vertical direction cover and a lateral direction cover to prevent chips from scattering to a driving mechanism side of the machine rear part by the machining. These lateral direction cover 4a and the vertical direction cover 4b are formed by a plurality of strip plates which overlaps each other in the vertical direction and the lateral direction and is arranged slidably, so as to expand and contract in accordance with the X-axis movement and the Y-axis movement of the spindle 2.

It is not shown, but on the front side of the spindle 2 of the bed 3, a workpiece table on which a workpiece is mounted is movably arranged in the axis 2a direction (Z-axis direction) of the spindle 2.

On the left side part of the bed 3, a dividing wall 5 which constitutes an accommodating space A is vertically provided. The dividing wall 5 has a side plate 5a which is a boundary between the accommodating space A and a machining area B, and a front plate 5b which continues to the front edge of the side plate 5a and is bent diagonally forward in the width direction. In the dividing wall 5, an opening 5c where a boring bar T is taken in and out is formed over the front plate 5b and the side plate 5a. The opening 5c is opened and closed by a shutter 6 which is arranged slidably in the vertical direction.

In the upper part inside the accommodating space A, a tool changer 7 which changes a long tool such as a boring bar T, etc. is arranged. In the lower part inside the accommodating space A, a too changer 18 which changes a short tool shorter than a boring bar, so called a double arm type that is conventionally known, is arranged.

The tool changer 7 is fixed through a mounting bracket 7a on the front edge of a magazine base 3a which is vertically provided on the left side part of the bed 3. The tool changer 7 has a tool holding part 8 holding a plurality of boring bars T (two in this embodiment), and a tool change mechanism 9 which changes the boring bar T held in the tool holding part 8 and a boring bar T' clamped in a spindle 2. Specifically, the boring bar T' clamped in the spindle 2 is held to the one available holding claw mechanism 11 of the tool holding part 8, and next, different boring bar T held in the other one of the holding claw mechanisms 11 of the tool holding part 8 is clamped to the spindle 2.

The tool holding part 8 is a rectangular frame-like flat plate, and has a holding plate 10 arranged vertically in parallel with the axis 2a of the spindle 2, and the upper and lower holding claw mechanisms 11, 11 arranged on the depth side of the holding plate 10. The holding claw mechanism 11 has a pair of the upper and lower holding claws 11a, 11b, and the upper holding claw 11a is driven by hydraulic pressure and moves in the vertical direction so as to firmly hold a holding groove Tg, which is formed in a tapered shank part of the boring bar T, with the lower holding claw 11b. With this structure of the tool holding part 8, the boring bar T is held in the manner in which the axis Ta of the boring bar T is parallel to the axis 2a of the spindle 2, and it is positioned on the left side of the spindle 2.

The tool change mechanism 9 is provided with a circular arc movement mechanism 12 and a linear movement mechanism 13. In the circular arc movement mechanism 12, the boring bar T moves from the tool holding position E to the position, where the boring bar T is coaxial with the axis 2a of the spindle 2, by performing the circular arc movement on the plane surface C including the axis 2a of the spindle 2 positioned in the tool change position D and the axis Ta of the boring bar T, which is held by the tool holding part 8, positioned in the tool holding position E (see FIG. 8).

In the linear movement mechanism 13, the boring bar T linearly moves in the direction of the axis Ta of the boring bar T before and after the circular arc movement (see FIGS. 9, 10, 14, and 16).

For example, when the boring bar T on the upper side is mounted to the spindle 2, the tool change position D is set in the position at the same height of the boring bar T on the upper side in the Y-axis direction, and at the same X-axis direction position after the completion of the circular arc movement by the circular arc movement mechanism 12.

The linear movement mechanism 13 is fixed to the mounting bracket 7a with a bolt by a support bracket 14 which extends in the direction of the axis 2a of the spindle 2. On the inside surface of the support bracket 14, the upper and lower guide rails 14a, 14a are arranged so as to extend in parallel with the axis 2a. A support plate 15 is supported slidably in the axis 2a direction by the guide rails 14a, 14a. In the support plate 15, a ball screw mechanism 16 which linearly moves the support plate 15 is connected. The ball screw mechanism 16 linearly moves the support plate 15 by rotationally driving the ball screw 16b, which is inserted into a nut member 15c fixed on the back surface of the support plate 15, by a driving motor 16a fixed to the support bracket 14.

The circular arc movement mechanism 12 has a structure in which the support plate 15 and the holding plate 10 are connected by a parallel link mechanism. The parallel link mechanism has a structure in which a support side shaft 15a, which is rotatably supported by the upper and lower bearings 15b, 15b fixed on the support plate 15, and a holding side shaft 10a, which is rotatably supported by the upper and lower bearings 10b, 10b fixed on the holding plate 10, are connected and fixed by the upper and lower link arms 17, 17. The holding plate 15 moves along the plane surface C by rotationally driving the support side shaft 15a by the cylinder mechanism, etc.

The movements of the tool change in the tool changer 7 according to the present embodiment 1, specifically the movements when the boring bar T, which is held in the upper holding claw mechanism 11 of the tool holding part 8, is clamped to the tool clamping part 2b of the spindle 2, are described.

The spindle 2 moves to the tool change position D. The tool change position D is set in the same height of the upper side boring bar T in the Y-axis direction, and in the same X-axis direction position of the boring bar T when the boring bar performs the circular arc movement. In this status in which the boring bar T is positioned in the tool holding position E, the tapered shank part Tb is overlapped with the front end part of the spindle 2 when viewed from the width direction (see FIG. 13).

Figure 8:
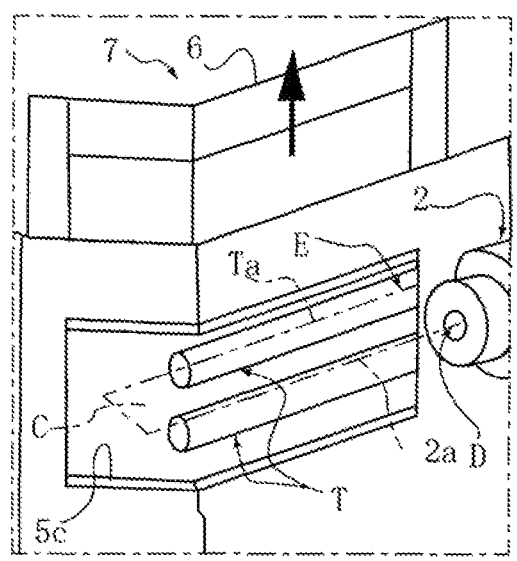
FIG. 8 is a front perspective view showing a shutter opening step in the tool change process.
Figure 9:
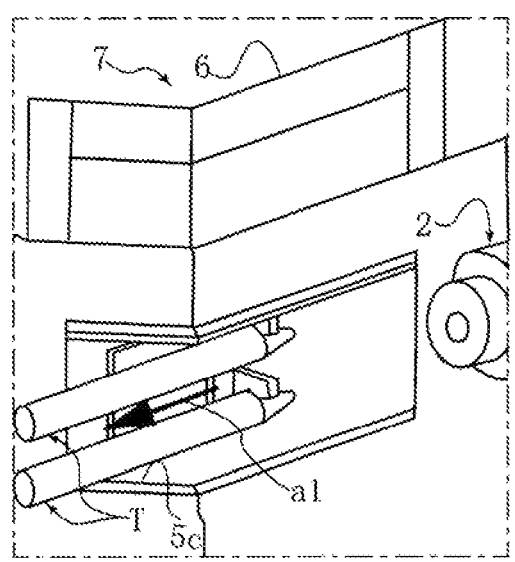
FIG. 9 is a front perspective view showing a tool forward movement step in the tool change process.

The opening 5c of the dividing wall 5 is opened by sliding the shutter 6 in the upper direction (see FIG. 8).

By the rotation of the driving motor 16a of the linear movement mechanism 13, the support plate 15 moves forward so as to move the holding plate 10 and consequently, move the boring bar T in the arrow a1 direction, and therefore, the tapered shank part Tb moves from the front end part of the spindle 2 to the position not obstructing the circular arc movement when viewed from the width direction. At this time, the boring bar T projects forward from the opening 5c of the dividing wall 5 (see FIGS. 9 and 14).

Figure 10:
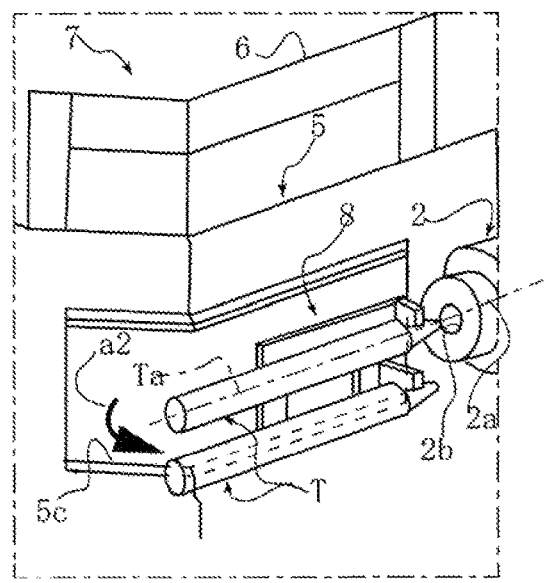
FIG. 10 is a front perspective view showing a tool circular arc movement step in the tool change process.
Figure 11:
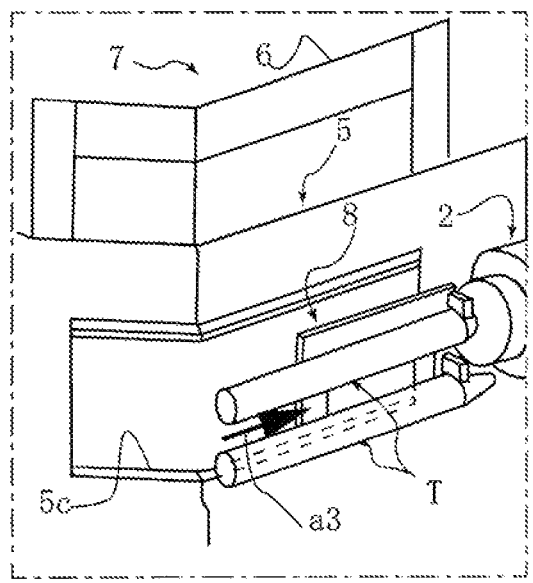
FIG. 11 is a front perspective view showing a tool backward movement step in the tool change process.
Figure 15:
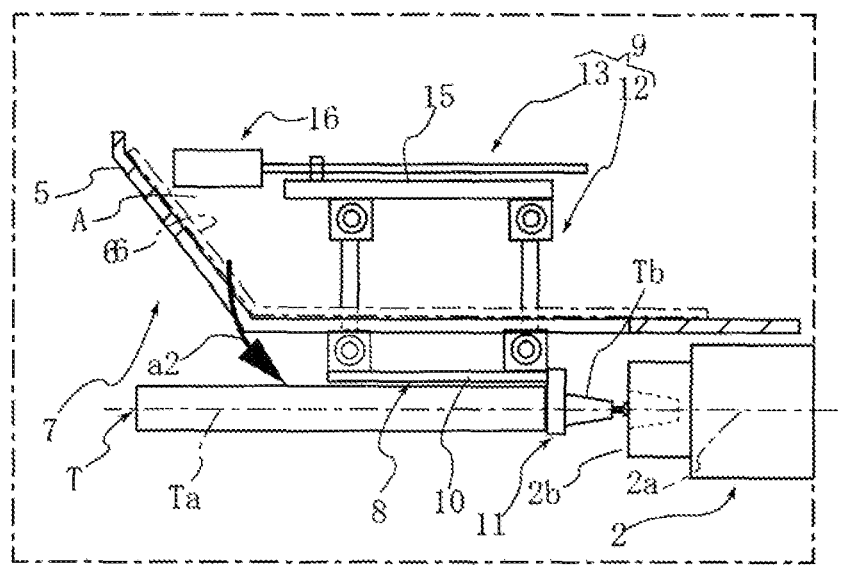
FIG. 15 is a plane view showing the tool circular arc movement step in the tool change process.
Figure 16:
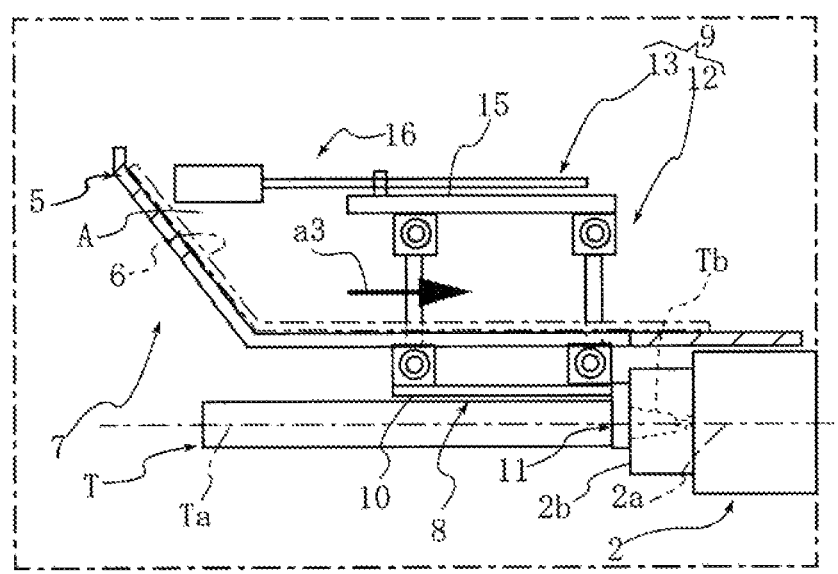
FIG. 16 is a plane view showing the tool backward movement step in the tool change process.

Next, by rotating the link arm 17 by the circular arc movement mechanism 12, the boring bar T moves in the arrow a2 direction as drawing a circular arc on the plane surface C while keeping the state in which the axis Ta of the boring bar T is parallel to the spindle axis 2a, and at the point when the link arm 17 rotates 90 degrees, the axis Ta of the boring bar T coincides with the axis 2a of the spindle 2 (see FIGS. 10 and 15).

Further, by rotating the driving motor 16a of the linear movement mechanism 13 in inverse direction, the support plate 15 moves backward so as to move the holding plate 10 and consequently, move the boring bar T in the arrow a3 direction. The tapered shank part Tb of the boring bar T is inserted into a tapered hole of the tool clamping part 2a of the spindle 2, and it is clamped in the tool clamping part 2a by a retract mechanism which is built-in (see FIGS. 11 and 16).

Figure 12:
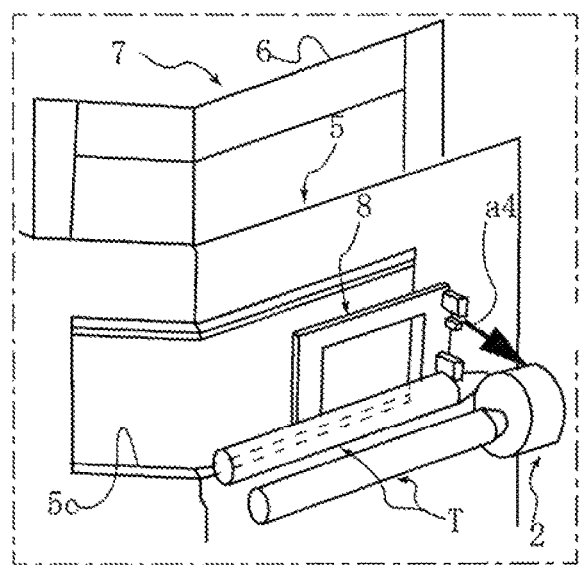
FIG. 12 is a front perspective view showing a tool pulling-out step in the tool change process.
Figure 13:
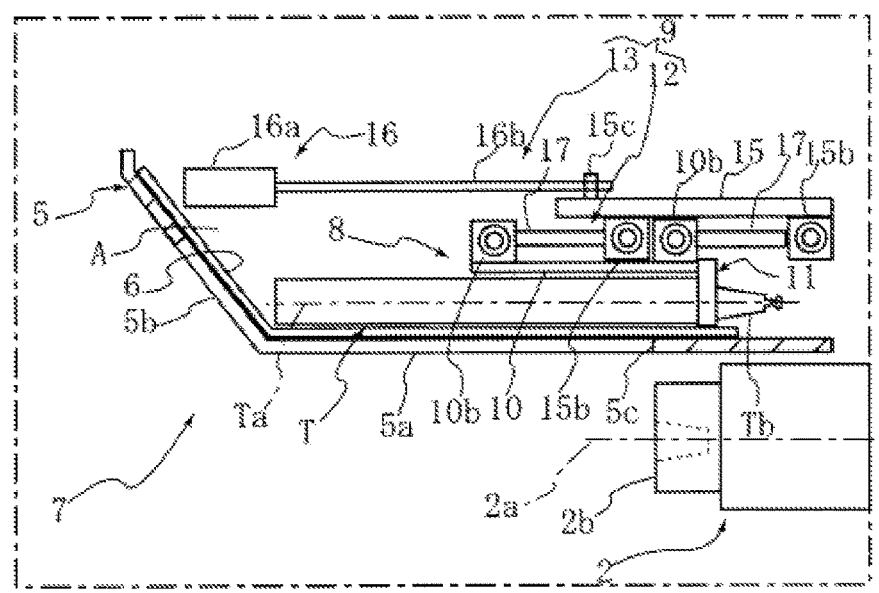
FIG. 13 is a plane view showing the preparation step in the tool change process.
Figure 14:
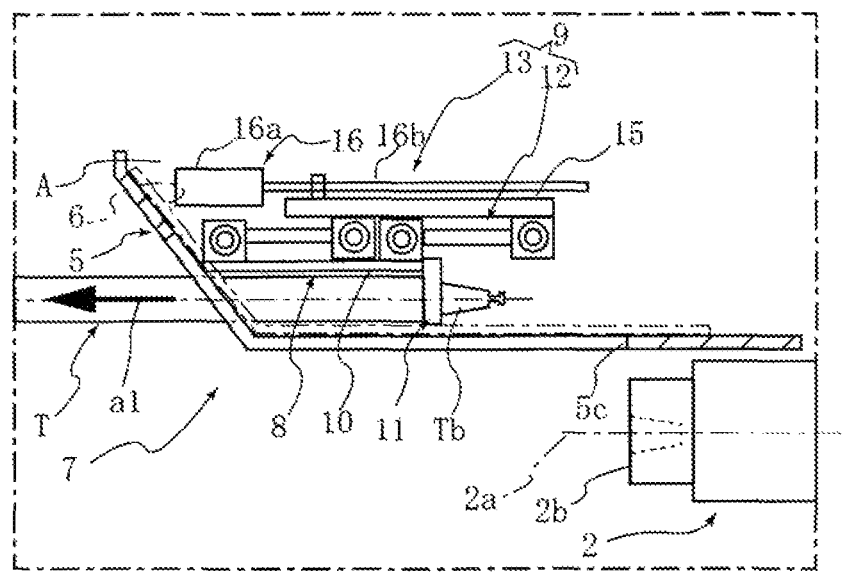
FIG. 14 is a plane view showing the tool forward movement step in the tool change process.

Next, when the holding claw 11a of the holding claw mechanism 11 is released, the boring bar T is pulled out from the holding part 8 in the arrow a4 direction by moving the spindle 2 in the X-axis direction (see FIG. 12).

According to the tool changer 7 in the present embodiment 1, the boring bar T is held in the manner in which the axis Ta of the boring bar T is parallel to the axis 2a of the spindle 2, and in the manner of being positioned on the left side of the spindle 2. Therefore, even if it is a long tool such as boring bar T, the width dimension (dimension in the X-axis direction) of the whole machine can be miniaturized when viewed from the spindle axis 2a direction in comparison with a case of holding the tools intersecting with the spindle axis 2.

Further, the boring bar T moves from the tool holding position E to the tool change position D, where the boring bar T is coaxial with the spindle axis 2a, by performing the circular arc movement on the plane surface C including the axis 2a of the spindle 2 and the axis Ta of the boring bar T. Therefore, the boring bar T can move in the width direction by using only the link mechanism, and the structure can be simplified.

Further, in addition to the circular arc movement mechanism 12, the linear movement mechanism 13 which linearly moves the boring bar T in the axis Ta direction is provided, so that the tapered shank part Tb of the boring bar T can be arranged to overlap with the tool clamping part 2a of the spindle 2 when viewed from the width direction, that is, the machine depth side. Therefore, the whole machine in the spindle axis 2a direction can be miniaturized, and when a large workpiece is mounted on a workpiece table, even if the workpiece table moves, the interference with the workpiece does not occur.

Specifically, regarding the tool change, before the circular arc movement, the overlapping with the boring bar T is avoided by the linear movement mechanism 13, and it moves forward to the position not obstructing the circular arc movement. After that, the tool moves by the circular arc movement in the circular arc movement mechanism 12. Therefore, the tool change can be performed without the interference between the boring bar T and the spindle 2.

Further, by the linear movement mechanism 13, the boring bar T moves backward after the circular arc movement, so that the tapered shank part Tb of the boring bar T is securely inserted into the tapered hole of the tool clamping part 2a of the spindle 2 without the mutual interference. Therefore, the tool change is more easily and securely performed.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A machine tool having a tool changer, comprising:
a tool holding part holding a plurality of tools; and
a tool change mechanism changing a tool held by the tool holding part and a tool clamped by a spindle,
wherein the tool holding part is positioned in a side of the spindle to hold the plurality of tools in a manner in which axes of the tools are parallel to an axis of the spindle,
the tool change mechanism includes a circular arc movement mechanism,
the circular arc movement mechanism moves the tools from a tool holding position to a tool change position at which the tool is coaxial with the axis of the spindle, by at least a circular arc movement on a plane on which the axis of the spindle positioned in the tool change position and an axis of the tool positioned in the tool holding part are arranged,
the tool position is different for each of the tools,
a dividing wall is formed between the tool change mechanism and the spindle,
the dividing wall includes an opening which is closed by a shutter, and
the circular arc movement mechanism moves the tools in the circular arc movement through the opening when the shutter opens the opening.

2. The machine tool according to claim 1, wherein the tool change mechanism includes a linear movement mechanism which linearly moves the tool in the direction of the axis of the tool at least before the circular arc movement.

3. The machine tool according to claim 1, wherein the tool is a boring bar which performs for long boring process.

\* \* \* \* \*